United States Patent
Ramaswamy et al.

(10) Patent No.: US 8,127,800 B2
(45) Date of Patent: Mar. 6, 2012

(54) FIRE PROTECTIVE HOSE ASSEMBLY

(75) Inventors: Nagarajan Ramaswamy, Fort Worth, TX (US); Peter J Stroempl, Fort Worth, TX (US); Allen G. Hoube, Orange Park, FL (US)

(73) Assignee: Parker-Hannifin Corporation, Cleveland, OH (US)

( * ) Notice: Subject to any disclaimer, the term of this patent is extended or adjusted under 35 U.S.C. 154(b) by 1331 days.

(21) Appl. No.: 11/937,676

(22) Filed: Nov. 9, 2007

(65) Prior Publication Data

US 2011/0000572 A1 Jan. 6, 2011

Related U.S. Application Data

(63) Continuation-in-part of application No. 11/068,319, filed on Feb. 28, 2005, now abandoned.

(60) Provisional application No. 60/869,802, filed on Dec. 13, 2006, provisional application No. 60/927,599, filed on May 4, 2007.

(51) Int. Cl.
*F15D 1/04* (2006.01)
(52) U.S. Cl. ......... 138/149; 138/109; 138/121; 138/140
(58) Field of Classification Search .................. 138/149, 138/137, 125, 124, 109, 140
See application file for complete search history.

(56) References Cited

U.S. PATENT DOCUMENTS

| | | | |
|---|---|---|---|
| 3,251,612 A | 5/1966 | Webbe | |
| 3,434,869 A | 3/1969 | Davidson | |
| 3,508,946 A | 4/1970 | Plueddemann et al. | |
| 3,552,445 A * | 1/1971 | Andrews | 138/144 |
| 3,665,968 A * | 5/1972 | De Putter | 138/141 |
| 4,137,949 A | 2/1979 | Linko, III et al. | |
| 4,158,371 A | 6/1979 | Reusser et al. | |
| 4,190,088 A | 2/1980 | Lalikos et al. | |
| 4,259,989 A | 4/1981 | Lalikos et al. | |
| 4,272,643 A | 6/1981 | Carroll et al. | |
| 4,275,769 A | 6/1981 | Cooke | |
| 4,340,090 A | 7/1982 | Matsushita et al. | |
| 4,341,842 A | 7/1982 | Lampe | |
| 4,367,889 A | 1/1983 | Redl | |
| 4,452,279 A | 6/1984 | Atwell | |
| 4,488,577 A * | 12/1984 | Shilad et al. | 138/127 |
| 4,509,559 A | 4/1985 | Cheetham et al. | |
| 4,611,832 A | 9/1986 | Matsuoka et al. | |
| 4,675,221 A | 6/1987 | Lalikos et al. | |
| 4,805,942 A | 2/1989 | Goodridge | |
| 4,942,903 A * | 7/1990 | Jacobsen | 138/110 |
| 5,183,079 A * | 2/1993 | Blin | 138/110 |
| 5,223,571 A * | 6/1993 | Igarashi et al. | 525/58 |

(Continued)

FOREIGN PATENT DOCUMENTS

EP 0805903 8/1996

(Continued)

*Primary Examiner* — Patrick F Brinson
(74) *Attorney, Agent, or Firm* — Robert Clark

(57) ABSTRACT

A flexible hose for conveying fluids and suitable for high temperature environments, in one embodiment the hose assembly comprises a thermal paint coated nipple, a core tube, a thermal insulating layer surrounding the core tube, a cover layer surrounding the thermal insulating layer, and a vented jacket surrounding the cover layer. The thermal insulating layer may be a fibrous material such as a silica fiber. The cover layer may be thermally stable up to 750° F. or higher. The vented jacket may be a wire braid having interstices therein and formed from a corrosion resistant material.

18 Claims, 2 Drawing Sheets

U.S. PATENT DOCUMENTS

| | | | |
|---|---|---|---|
| 5,571,625 A | 11/1996 | Porte et al. | |
| 5,608,963 A | 3/1997 | Lefere | |
| 6,334,466 B1 * | 1/2002 | Jani et al. | 138/141 |
| 2006/0100328 A1 | 5/2006 | Goossens | |
| 2006/0151043 A1 | 7/2006 | Nanney et al. | |
| 2006/0201566 A1 | 9/2006 | Brink et al. | |
| 2007/0079885 A1 | 4/2007 | Zaborszki et al. | |

FOREIGN PATENT DOCUMENTS

| | | |
|---|---|---|
| GB | 2325728 A | 12/1998 |
| JP | 11051289 A | 2/1999 |
| JP | 11131631 A | 5/1999 |

* cited by examiner

FIRE PROTECTIVE HOSE ASSEMBLY

CROSS-REFERENCE TO RELATED CASES

The present application is a continuation-in-part of application Ser. No. 11/068,319, filed Feb. 28, 2005 now abandoned which is hereby incorporated by reference. This application also claims the benefit of U.S. Provisional Application Ser. No. 60/869,802; filed Dec. 13, 2006 and U.S. Provisional Application Ser. No. 60/927,599; filed May 4, 2007, the disclosures of which are expressly incorporated herein by reference.

TECHNICAL FIELD

The present invention relates broadly to hose constructions, and more particularly to a fire resistant construction which may find particular use in aerospace applications.

BACKGROUND

Hose systems, particularly fuel, lubricating, and hydraulic hose, such as those used within aircraft engine compartments, often require fire resistant protection to minimize the likelihood of fire or high temperatures damaging the flexible elastomeric hose of the hydraulic circuits. FAA standards require certain devices to withstand the heat of a burning aircraft for a period of fifteen minutes before exposing the enclosed devices to the fire. For example, a fuel hose must not release fuel into a fire for the initial fifteen minutes of burning. After fifteen minutes of elapsed time, under the current standards, it is no longer necessary to preclude the flame from reaching the covered device.

Typically, resistance to fire and high temperature is achieved by encompassing the hose and portions of the associated hose fittings with a protective firesleeve. The firesleeve often consists of a silicone rubber tube surrounding the hose and/or fitting and the firesleeve. A problem with silicon rubber firesleeves is that they will ablate when subjected to fire. Another problem with silicon rubber firesleeves is that they will not provide protection from oil, fuel, or chemical attack. Finally another problem is that the silicon rubber firesleeves do not provide resistance to chafing.

SUMMARY

At least one embodiment of the invention provides a hose assembly comprising: a core tube; an insulating layer surrounding the core tube; and a vented anti-chafing jacket surrounding the insulating layer; wherein the vented anti-chafing jacket is the outermost layer of the hose; and wherein the insulating layer is non-ablative at least when the hose is subjected to a fire at 2000° F. for a period of 15 minutes.

At least one embodiment of the invention provides a hose assembly comprising: a PTFE tube; a reinforcing layer surrounding the PTFE tube; an insulation layer comprising silica fiber, the insulation layer surrounding the reinforcing layer; a cover layer comprising polyimide, the cover layer surrounding the insulation layer; and a corrosion resistant braid positioned about the cover layer and forming an outer layer of the hose.

At least one embodiment of the invention provides a hose assembly comprising: a reinforced core tube; a fitting attached to each end of the core tube, wherein an exterior surface of a nipple portion of each fitting is coated with a thermal paint and inserted into the core tube.

These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawing wherein.

DETAILED DESCRIPTION OF THE DRAWINGS

For the purposes of the discourse to follow, the precepts of the hose construction of the invention herein involved are described in connection with representative embodiments which are adapted particularly for use as a conduit for the aerospace installations such as for fuel, lubrication, or hydraulic lines. It will be appreciated, however, that aspects of the present invention may find use in other applications such as for instrumentation, control, sensing, and fluid transfer or power. Use within those such other applications therefore should be considered to be expressly within the scope of the present invention.

Figure 1:
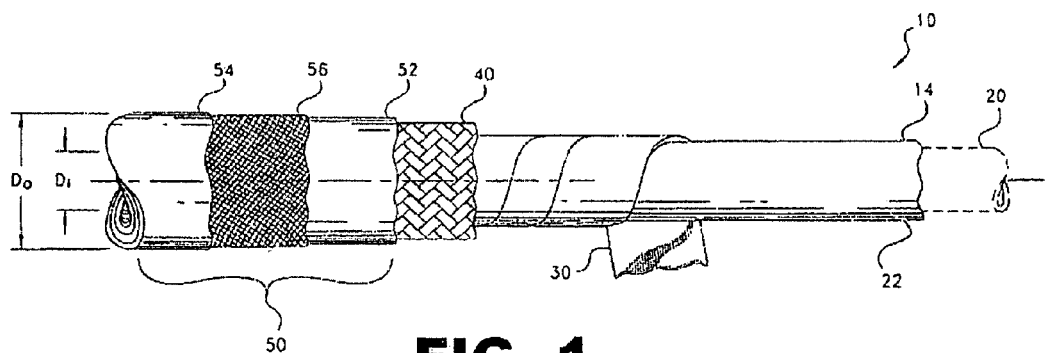
FIG. 1 is a side elevational, cut-away view of a first embodiment of a hose construction in accordance with the present invention.

Referring then to the figure wherein corresponding reference numbers are used to designate corresponding elements throughout the several views with equivalent elements being referenced with prime or sequential alphanumeric designations, a representative fire-resistant flexible hose construction according to the present invention is shown generally at 10 in the cut-away view of FIG. 1. In basic dimensions, hose construction 10 extends axially to an indefinite length along a central longitudinal axis, 12, and in a radial direction circumferentially about axis 12 in defining a select inner and outer diameter referenced, respectively, at "Di" and "Do." The inner and outer diameter dimensions may vary depending upon, for example, the pressure rating for the intended application, but generally may be between about 0.1-1.5 inch (0.254-3.81 cm) for inner diameter Di, and between about 0.35-2.5 inch (0.889-6.35 cm) for outer diameter Do, for a overall wall thickness therebetween of between about 0.125-0.5 inch (0.318-1.27 cm).

As may be seen in FIG. 1, hose 10 is constructed as being formed about a tubular core, referenced at 14. Core tube 14 may itself have an inner diameter of between about 0.1-1.5 inch (0.254-3.81 cm), and an outer diameter of between about 0.150-1.7 inch (0.381-4.32 cm) for a wall thickness therebetween of between about 0.025-0.1 inch (0.06-0.254 cm). However, and as with the overall dimensions of hose construction 10, the dimensions of the core tube 14 may vary with the particular application involved. Typically, the core tube 14 may be generally round in cross-section as shown, but alternatively may be of an elliptical, polygonal, or other geometric shape.

Core tube 14 may be provided as extruded, molded, or otherwise formed of a plastic or other polymeric resin which typically may be a thermoplastic. Suitable materials, along with copolymers and blends, mixtures, alloys, or other combinations thereof, include polyesters, polyvinyl chlorides, polyimides, polyurethanes, poly(ether ether ketone), polyetherimides, polybutylene and polyethylene terephthalates, polysulfones, polyacrylics, polymethylacrylates, polymethylmethacrylates, polycarbonates, poly(ester and ether urethanes), liquid crystal polymers (LCP), acetal homo and copolymers, polyolefins such as high density or molecular weight polyethylene and polyamides such as Nylon 12, and fluoropolymers, but as may be specifically selected for high or low temperature resistance, surface characteristics such as coefficient of friction, physical or mechanical properties such as flexural modulus, or, in the case of fluid transfer, chemical compatibility with the fluid being handled. Indeed, for many aerospace applications or other applications calling for chemical resistance, a fluoropolymer may be specified. Representative fluoropolymers include polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetrafluoroethylene (ETFE) terpolymer, polyvinylidene fluoride (PVDF), polyvinylfluoride (PVF), and copolymers and blends and other combination thereof. As used herein, "chemical resistance" should be understood to mean the ability to resist swelling, crazing, stress cracking, corrosion, or otherwise to withstand attack from mild acidic or alkaline solutions, phosphate-ester solutions, and alcohols and other organic solvents and hydrocarbons, as well as inorganic solvents such as water or brine. As mentioned the material forming the core tube 14 may be a homo or copolymer, or a combination thereof such as a blend of one or more homopolymers, one or more copolymers, or one or more homopolymers and one or more copolymers. Such materials each additionally may be admixed with other resins, which may be thermoplastic or thermosetting, such as to form an alloy, blend, mixture, or other combination, or a copolymer thereof.

Alternatively, core tube 14 may be formed of a resin which is a thermoplastic, i.e., melt-processible, synthetic rubber such as a chlorosulfonate, polybutadiene, butyl, neoprene, nitrile, polyisoprene, or buna-N, a copolymer rubber such as ethylene-propylene (EPR), ethylene-propylene-diene monomer (EPDM), nitrile-butadiene (NBR) or styrene-butadiene (SBR), or a blend such as ethylene or propylene-EPDM, EPR, or NBR, or a copolymer or blend of any of the foregoing. The term "synthetic rubbers" also should be understood to encompass materials which alternatively may be classified broadly as thermoplastic elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides.

The material forming core tube 14 may be compounded with one or more other fillers, and/or with modifiers or other additives. Such additives, which may be functional or inert, may be provided to be in liquid, powder, particulate, flake, fiber, or other form, and may include other electrically-conductive fillers, microwave-attenuating fillers, thermally-conductive fillers, lubricants such as molybdenum disulfide (MOS2), wetting agents, surfactants, stabilizers, antioxidants, dispersants, pigments, dyes, and other colorants, colorings, or opacifying agents such as for coloring-coding of the tubing, luminescents, light reflectants, anti-static agents, coupling agents such as titanates, chain extending oils, tackifiers, flow modifiers, blowing agents, foaming or anti-foaming agents, reinforcements such as glass, carbon, or textile fibers, silanes, peroxides, film-reinforcing polymers and other agents, emulsifiers, thickeners, and/or flame retardants and other fillers such as aluminum trihydrate, antimony trioxide, metal oxides and salts, intercalated graphite particles, phosphate esters, decabromodiphenyl oxide, borates, siloxanes, phosphates, halogenated compounds, glass, silica, which may be fumed or crystalline, silicates, mica, ceramics, and glass or polymeric microspheres. Typically, the additives are blended or otherwise admixed with the base material, and may comprise between about 0.05% and 80% or more by total volume of the formulation.

Indeed, for many aerospace applications, and particularly those involving fuel transfer, an electrically-conductive core tube 14 would be specified such as for static dissipation and/or electrical grounding. The resin forming the tube 14 thus may be filled with a carbon black or other electrically-conductive filler. As admixed with the black, the resin generally may form a binder into which the black filler may be dispersed. The black filler generally may included within the resin in a proportion sufficient to provide the level of electrical conductivity which is desired for the intended application. For many applications, a conductivity of 12 [mu]A@1000 VDC for the core tube 14 will be specified as in accordance with SAE Standard AS2078.

Core tube 14 also may be provided as having a multi-layer, i.e., two or more layer, laminate construction. Such laminate construction may include at least a first layer, which is shown in phantom at 20 to be the innermost layer, and an second layer, which is shown to be the outermost layer and is commonly referenced at 22 with the tube 14. In the illustrative embodiment of hose 10 depicted in FIG. 1, the second layer 22 may be concentric with and integrally adjoining the first layer 20. In alternative constructions, the layers 20 and 22 also may be reversed such that layer 20 forms the outermost layer and layer 22 forms the innermost layer. Additional layers also may be provided between the layers 20 and 22, and/or as surrounding or being surrounded by the layers 20 and 22.

The wall thicknesses of each of the layers 20 and 22, and of any other layers forming the core tube 14, may be of any thickness, both absolute and relative to the thickness of the other layers. For many applications, however, and as may be irrespective of which of the layers 20 and 22 is the innermost layer and which is the outermost layer, the first layer 20 may function as a liner as being relatively thin and formed of a fluoropolymer or other chemically resistant material, which as before may be filled or unfilled, with second layer 22 functioning as a support or backing as being relatively thick and formed of a less expensive, but stronger, more general purpose resin such as a polyimide, which also may be filled or unfilled. For cost and performance considerations, the wall thickness of the second layer 22 may comprises between about 70-80% of the overall thickness of the layers 20 and 22, with the wall thickness of the first layer 20 comprising between about 20-30% of such overall thickness, i.e., the wall thickness of the second layer 22 being about 1-10 times thicker than the thickness of the first layer 20.

To the extent formed of compatible resin materials, the layers 20 and 22 layers may be extruded, such as by being co-extruded or sequentially extruded, or otherwise formed as being cross-linked together or otherwise chemically or fusion bonded together directly at their interface into an integral, tubular composite, i.e., laminate structure. Alternatively, if formed of dissimilar or otherwise incompatible resin materials, an adhesion-promoting surface treatment may be applied between the interfacing surfaces thereof the layers 20 and 22. Alternatively, one or more intermediate tie or bonding layers may be co-extruded or otherwise interposed between the layers 20 and 22 as being formed of a material which is adhesion or fusion bond, or otherwise co-compatible with both the materials of layers 20 and 22. The wall thicknesses of such intermediate layer or layers typically will be less than or about equal to the wall thickness of the other layers.

In accordance with the precepts of the present invention, at least one thermal insulation layer, 30, is provided to surround the core tube 14 for thermally insulating or other or otherwise protecting the core tube 14 in the event of a fire situation, and thereby assisting in maintaining the core tube 14 at temperature below the combustion temperature thereof. Thermal insulation layer 30 may be formed from one or more layers of a thermoplastic polymeric material which may be provided in the form of a tape or other film which may be spiral, i.e., helically, wrapped in an overlapping manner along axis 12 over the outer surface, 32, of the core tube 14 or over any intermediate layers which may be interposed therebetween. The thermal insulation layer alternatively may be longitudinally, i.e., "cigarette," wrapped over the core tube 14, or cross-head, co-extruded, or otherwise conventionally extruded over the core.

Depending upon, for example, the diametric extent of the tube 14, the tape or other form of the insulation layer or layers 30 each may have a thickness of between about 5-10 mils (0.127-0.254 mm). However, as the degree of fire resistance provided in the hose 10 by the one or more layers 30 will be generally proportional to the thicknesses of those layers, it should be understood that thicker layers or multiple thinner layers can be provided in the construction 10 to increase the fire resistance thereof. Indeed, flame resistance performances, such per SAE Standard AS1055, of 15 minutes or longer may be achieved using a thicker insulation layer 30, which may be either one or more thicker layers or a combination of two or more thinner layers which may be used to achieve a specified overall thickness. If in form of a tape, such tape may be between about 0.5-2.0 inch (1.3-5.0 cm) wide.

In whatever form provided, the thermoplastic resin material forming the insulation layer 30 may be unfilled or, alternatively, filled with one or more fillers and/or additives such as in the manner described hereinbefore in connection with the material forming the core tube 14. Suitable thermoplastic materials generally will include those materials classified as "engineering" thermoplastics, and particularly those materials, which may be homopolymers or copolymers, and which also may be blends, alloys, mixtures, or other combinations of two or more different materials, which may be further classified as "high temperature" materials as having a melting point of at least about 300[deg.] C. Representative materials include, particularly, polyimides such as those marketed under the name Kapton® (E.I. DuPont de Nemours and Co., Wilmington, Del., USA). Other suitable thermoplastic materials in addition to polyimides include polysulfones, polyetheretherketones, and copolymers and combinations of such materials, and of such materials with other materials.

With continuing reference to the illustrative construction of hose 10 depicted in FIG. 1, one or more reinforcement layers, one of which is referenced at 40, may be provided as knitted, braided, woven, spiral, i.e., helically, or otherwise wound, and/or wrapped or otherwise formed to surround the insulation layer 30. Each of the reinforcement layers 40 may be formed of one or more filaments, which may be monofilaments, continuous multi-filament, i.e., yarn, stranded, cord, roving, thread, braid, tape, or ply, or short "staple" strands, of one or more fiber materials. The fiber material, which may be the same or different in each of the reinforcement layers which are provided, and which may be a blend, alloy, or other combination of two or more different materials in each layer, may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend or other combination thereof, or, particularly, a metal wire such as a steel, which may be galvanized or stainless or otherwise corrosion resistant (CRES), aluminum, nickel, copper, brass, or zinc or zinc-plated, or a blend, alloy, or other combination thereof.

With respect to the illustrative hose construction 10 shown in FIG. 1, a single reinforcement layer 40, such as formed of a monofilament CRES steel or other metal wire, is shown to be braided about the insulation layer 30 as providing, for example, about a 100% coverage thereof. Such braiding may be effected, for example, under tension at a pitch angle of between about 45-63[deg.] and using from between 16-64 carriers each having from between about 1 to about 60 ends of the wire. The wire itself may have a nominal diameter of between about 5-40 mils (0.01-0.1 mm) and/or a tensile strength of between about 100,000-450,000 psi (690-3103 MPa). The tension and area coverage at which the reinforcement layer 40 may be braided may be varied to achieve the desired flexibility, which may be measured by bend radius, flexural forces, or the like, of the hose 10.

The outermost reinforcement layer or layers 40, in turn, may be sheathed within one or more layers of a coaxially-surrounding protective firesleeve, or other cover or jacket, referenced at generally at 50. Depending upon its construction, cover 50 may be integrally formed as spray-applied, dip coated, cross-head or co-extruded, or otherwise conventionally extruded, spiral or longitudinally, i.e., "cigarette," wrapped, or braided over the reinforcement layer 40, or otherwise separately formed and sheathed thereover. In either case, the cover 50 may include one or more layers, two of which are shown at 52 and 54. One or both of the layers 52 and 54, which may formed of the same or of different materials, formed of an ablative polymeric material, such as a cross-linked silicone resin, which may be a homopolymer or copolymer, or a blend, alloy, mixture, or other combination thereof. For example, a cross-linked silicone resin may be blended or otherwise compounded with a harder material, such as a thermoplastic polyurethane resin or the like, to provide increased abrasion resistance. The silicone resin or blend or other material forming the one or both of the layers 52 and 54 may be unfilled or filled with one or more fillers or additives such as a glass, fiberglass, mica, ceramic, or metal particulates.

The firesleeve 50 itself and/or the layer 52 and/or 54 themselves may be reinforced with one or more reinforcement layers, such as the layer 56 shown to be interposed between the layers 52 and 54, which may be knitted, braided, woven, spiral, i.e., helically, or otherwise wound, and/or wrapped or otherwise formed of a fibrous material such as a synthetic monofilament or yarn, or a metal wire, or typically, a fiberglass. The one or more reinforcement layers 56 may be encapsulated or otherwise interposed as shown between layers 52 and 54. With or without the one or more reinforcement layers 56, the firesleeve 50 may have a thickness of between about 0.05-0.2 inch (0.13-0.51 mm) as formed of the one or more layers 52 or 54, which each of the layers 52 and 54 having a thickness, independently, of between about 0.01-0.15 inch (0.03-0.38 mm). If formed of chemically compatible materials, the respective layers 52 and 54 may be fusion bonded together at their interface. Alternatively, if formed of chemically incompatible materials, the respective layers 52 and 54 may be bonded together with an adhesive or by means of a surface treatment or tie layer (not shown) interposed therebetween, such as in the manner described hereinbefore in connection with the layers tube layers 20 and 22.

Although the illustrative fire-retardant hose construction 10 of FIG. 1 has been described wherein a thermal insulation layer 30 is employed as immediately adjacent the core tube 14, other constructions may be envisioned in view of the disclosure contained herein, and as dictated by the requirements of the particular application involved. For example, multiple layers of insulation layer 30 may be employed within the construction 10.

Figure 2:
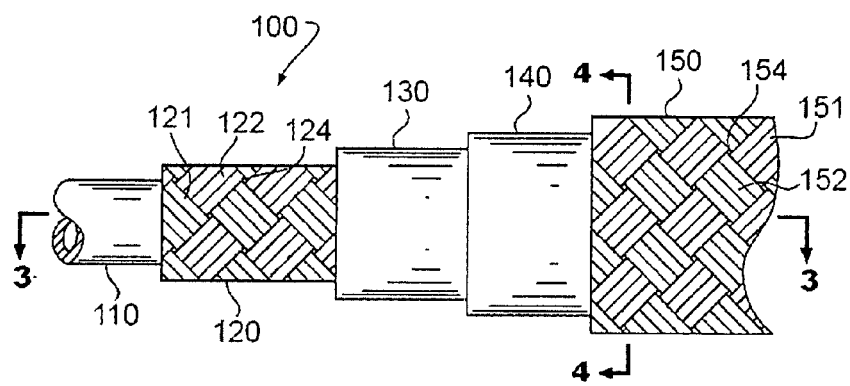
FIG. 2 is a side-elevational, cut-away view of a hose in accordance with a second embodiment of the present invention.
Figure 3:
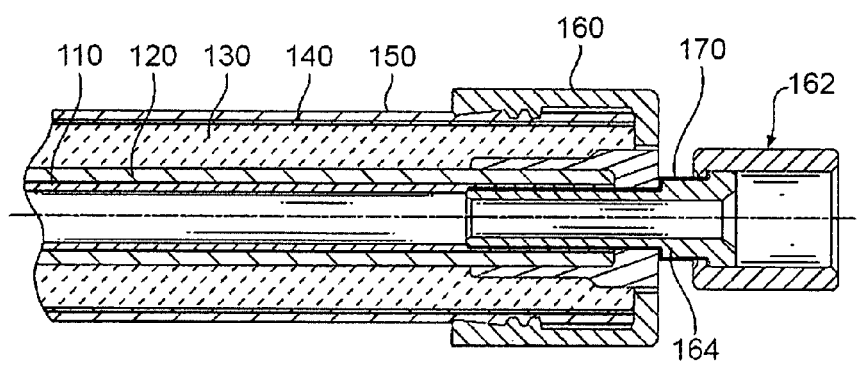
FIG. 3 is a cross-sectional view of the assembled hose in FIG. 2 taken along the line 3-3.
Figure 4:
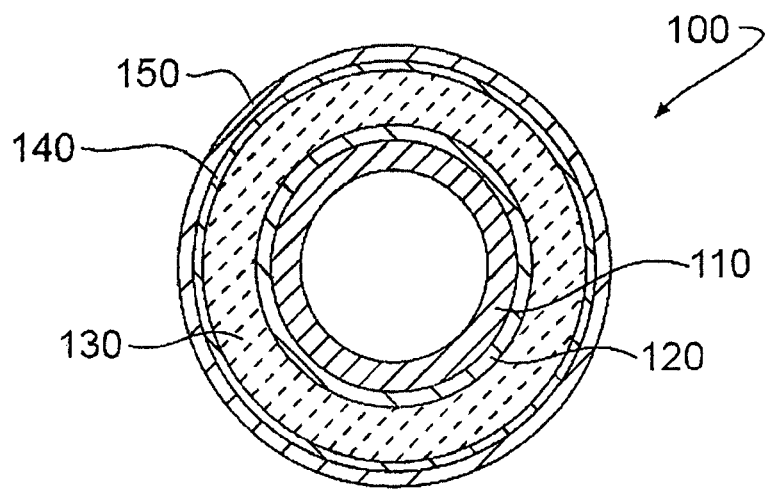
FIG. 4 is a radial cross-sectional view of the assembled hose of FIG. 2 taken along the line 4-4.

Referring now to FIGS. 2-4, a hose 100 is shown comprising a core tube 110, a reinforcement layer 120 surrounding the core tube 110, a firesleeve insulating layer 130 surrounding the reinforcement layer 120, a chemical resistant cover layer 140 (which is optional in one embodiment of the invention) surrounding the firesleeve insulating layer 130, and a vented anti-chafing jacket 150 surrounding the chemical resistant cover layer 140. As shown in FIG. 2, the vented anti-chafing jacket 150 is a wire braid and comprises gaps or interstices 154 between adjacent wire strands 151, 152.

Figure 5:
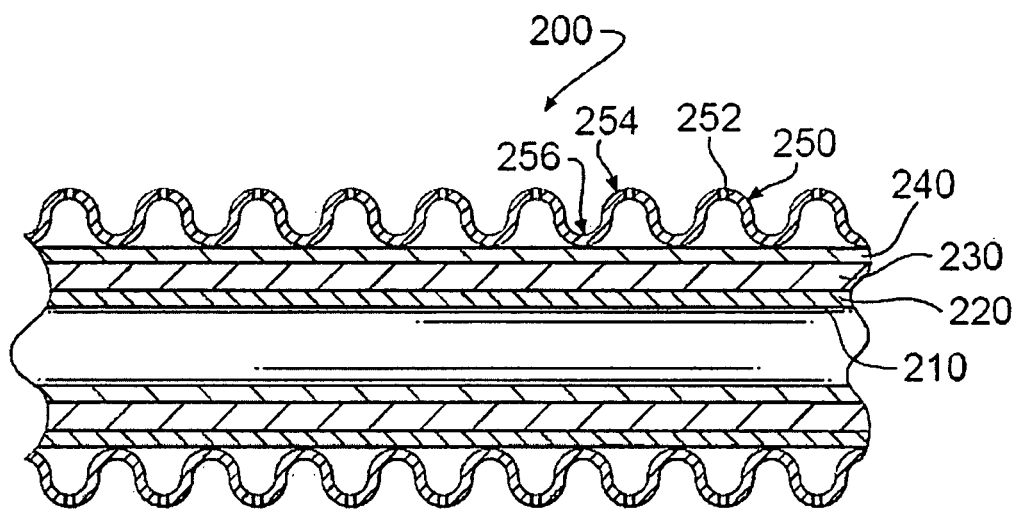
FIG. 5 is a cross-sectional view of a hose, taken along the longitudinal axis, in accordance with another embodiment of the present invention employing a vented jacket comprising a corrugated tube.

FIG. 5 illustrates a hose 200 comprising a core tube 210, a reinforcement layer 220 surrounding the core tube 210, a firesleeve insulating layer 230 surrounding the reinforcement layer 220, a chemical resistant cover layer 240 surrounding the firesleeve insulating layer 230, and a vented anti-chafing jacket 250 surrounding the chemical resistant cover layer 240. The vented anti-chafing jacket 250 is a corrugated tube comprising vent hole or holes 252 disposed through a wall of the tube 250.

The core tube 110, 210 may be formed from any suitable material as desired for a particular purpose or intended use. In one embodiment, the core tube is made from a polytretrafluoroethylene (PTFE) material, such as Teflon®. The size and dimensions of the core tube, including the inner and outer diameter of the core tube, may be selected as desired for a particular purpose or intended use.

FIGS. 2-5 show a base hose construction comprising a core tube 110, 210 with a surrounding reinforcement layer 120, 220. Materials suitable as a reinforcement layer are known in the art, and the material(s) used as a reinforcement layer may be selected as desired for a particular purpose or intended use. Additionally, the thickness and/or number of reinforcement layers may be selected based on the desired mechanical properties, including a desired level of flexibility. The reinforcement layer(s) may be formed from a metal wire, as is known in the art. Suitable metal wires include, for example, those made from stainless steel, brass plated steel, Nickel alloy or the like. A particularly suitable metal for the reinforcement layer is stainless steel. The reinforcement layer 120 in FIG. 2 is shown as a braid of alternating interwoven wires 121, 122. The configuration of the braid is not limited and may be selected as desired. For example, the braid may be a one over, one under configuration (as shown in FIG. 1), a two over, two under configuration, or any other configuration. Additionally, the size of the gaps 124 between adjacent wires is not limited. It will be appreciated that a metal wire reinforcement layer need not be in a braid but may be spirally wound or otherwise laid over the core tube.

The firesleeve insulating layer(s) such as layers 130 and 230 in FIGS. 2 and 5, respectively, may be any suitable material for providing fire resistant thermal insulation to the underlying hose structure, i.e., the core tube or the core tube in combination with one or more reinforcing layers. In one embodiment, the firesleeve insulating layer 130, 230 may be a silicone material. In one embodiment, the firesleeve insulating layer 130, 230 may be a fibrous material comprising a material chosen from silica fibers, fiberglass, ceramic fibers, and the like. The fibrous material may be provided as a strip or tape that is wound about the core tube (or, if applicable, wound about a reinforcement layer overlying the core tube). A suitable material for the firesleeve insulating layer 130, 230 is a silica fiber available from ADL Insulflex Inc. The thickness of the firesleeve insulating layer(s) 130, 230 may be selected as desired to provide a desired level of thermal insulation to the underlying core tube. That is, the thickness may be selected such that the temperature of the core tube's outer surface does not exceed a desired threshold limit over a given period of time. In one embodiment, the firesleeve insulating layer 130, 230 has a thickness that is about 30 to about 70% of the overall radius of the hose assembly. In one embodiment, the firesleeve insulating layer 130, 230 may have a thickness in the radial dimension of from about 0.1 to about 0.3 inches. The number of firesleeve insulating layers 130, 230 may be selected as desired to provide a particular level of thermal insulation as well as maintain other desirable properties for the hose including, for example, a desired level of flexibility. Where multiple firesleeve insulating layers 130, 230 are employed, the layers may be formed from the same or different materials. When the firesleeve insulating layer 130, 230 comprises two or more layers, the layers may be the same or different in terms of thickness and/or the materials used in the respective layers.

The chemical resistant cover layer 140, 240 may be formed from any material suitable for functioning as a chemical resistant barrier layer. As used herein, "chemical resistance" should be understood to mean the ability to resist swelling, crazing, stress cracking, corrosion, or otherwise to withstand attack from mild acidic or alkaline solutions, phosphate-ester solutions, and alcohols and other organic solvents and hydrocarbons, as well as inorganic solvents such as water or brine. The chemical resistant cover layer 140, 240 may also provide some degree of abrasion resistance to the hose. Desirably, the chemical resistant cover layer 140, 240 may be formed from a polymeric material that is formable as a film and/or is thermally stable at temperatures up to at least about 450° F. In one embodiment, the chemical resistant cover layer 140, 240 is formed from a material that is thermally stable up to at least about 750° F. Particularly suitable materials for the cover layer include polyimide films such as those available from DuPont under the tradename Kapton®. An example of a suitable film is Kapton® HN, which may be used at temperatures as high as about 752° F. The chemical resistant cover layer 140, 240 may have any desired thickness. In one embodiment, the chemical resistant cover layer 140, 240 has a thickness of from about 0.002 to about 0.03 inches.

The core tube 110, 210, reinforcement layer(s) 120, 220, firesleeve insulating layer(s) 130, 230, and chemical resistant cover layer(s) 140, 240 are contained within the vented anti-chafing jacket 150, 250. The vented anti-chafing jacket 150, 250 provides abrasion, scuff, and/or impact resistance and protects the underlying hose structure. The vented anti-chafing jacket 150, 250 should be dimensioned so as to allow the hose to have a desired level of flexibility. The vented anti-chafing jacket 150, 250 comprises one or more vent holes such as, for example, gaps or interstices 154 in wire braid 150 as shown in FIG. 2, or vent holes or apertures 252 in corrugated tube 250 as shown in FIG. 5. The vent holes 252 may prevent air from being trapped underneath the anti-chafing jacket 250 and/or the chemical resistant cover layer 240, which may cause the chemical resistant cover layer 240 to balloon or swell and even break.

In the embodiment shown in FIG. 2, the anti-chafing jacket 150 comprises a wire braid having alternately interwoven wires 151, 152 wound in opposite directions in an over and under pattern. Even though the braid may be relatively tight, small gaps or interstices 154 will occur at the intersection of adjacent wires. The wire braid may have any configuration as desired including, for example, a one over, one under configuration (as shown in FIG. 2), a two over, two under configuration, or the like. The size of gaps or interstices 154 is not limited and may be selected for a particular purpose or intended use.

As shown in FIG. 5, a vented jacket 250 formed from a corrugated tube comprises vent holes 252 disposed in a wall of the tube. The configuration of the corrugated tube is not limited and may be selected as desired. For example, corrugated tube 250 is shown as having rounded peaks 254 and rounded valleys 256. The peaks 254 and valleys 256 may be shaped as desired and may have, for example, square peaks and square valleys, rounded peaks and square valleys, square peaks and rounded valleys, combinations thereof, or other shapes as desired. The distance or spacing between adjacent peaks 254 is also not limited. The number and location of vent holes 252 may also be selected as desired. As shown in FIG. 4, vent holes 252 are located near the apex of peaks 254. The vent holes 252, however, may be located in any portion of the wall of the corrugated tube 250.

The vented anti-chafing jacket 150, 250 may be made of a corrosion resistant material such as, for example, a stainless steel or a nickel alloy. The corrosion resistant material should be able to withstand temperatures of about 450° F. or higher. In one embodiment, the corrosion resistant material should be able to withstand temperatures of about 600° F. or higher, and, in another embodiment, up to at least about 750° F. Stainless steels or nickel alloys may form chromium carbides at elevated temperatures, which cause the material to break down. In one embodiment, the vented anti-chafing jacket 150, 250 comprises a material that is resistant to chromium carbide formation when the ambient temperature around the jacket is about 600° F. or higher. Suitable corrosion resistant materials include, but are not limited to, nickel-based alloys such as those sold under the tradename Inconel®. The vented anti-chafing jacket 150, 250 may also be formed from corrosion resistant (CRES) stainless steels including, but not limited to, type 304, type 321, and type 347 stainless steels. Type 321 and type 347 stainless steels are particularly suitable for high temperature applications and may be resistant to chromium carbide formation at temperatures of about 600° F. or higher. In one embodiment, the vented anti-chafing jacket 150 comprises a wire braid formed from a type 321 stainless steel, a type 347 stainless steel, or combinations thereof, and is resistant to chromium carbide formation at temperatures of at least about 600° F.

The hose 100, 200 may be made by forming a core tube 110, 210 such as by extrusion, applying an insulating layer 130, 230 around the core tube 110, 210 applying a cover layer 140, 240 around the insulating layer 130, 230 and applying a vented jacket 150, 250 around the cover layer 140, 240. The insulating layer 130, 230 may be applied by, for example, wrapping a strip or tape of fibrous material around the core tube 110, 210 (or optionally a reinforcement layer 120, 220 overlying the core tube). Depending on the material used as the insulating layer 130, 230 the insulating layer may also be extruded over the core tube 110, 210 or an optional reinforcement layer 120, 220. The cover layer 140, 240 may be formed by extrusion. The vented jacket 150, 250 may be applied by braiding; or applied using a braided sleeve or corrugated tube manually installed.

It will be appreciated that the hose 100, 200 may have a fitting attached to each end for making appropriate connections as desired for a particular purpose or intended use. In FIG. 3, for example, the assembled hose 100 of FIG. 2 is shown as having a hose fitting 162, including a nipple 164 positioned within the core tube 110 and a socket 166, and a sleeve 160 crimped on an outer end of the core tube 110.

When using the hose 100, 200 with a fitting 162, typically made of steel, the fitting 162 provides a conductive path for the heat around the fire sleeve to the interface of the fitting 162 and the hose 110, which is typically made of PTFE. A fire produces a great amount of thermal energy that can subject the materials contacting the fitting 162 to material damage. In FIG. 3, a thermal coating 170 is shown applied to the exterior surface of the nipple 164. This protects the interior of the core tube 110 and accordingly extends the life of the hose 100 in a fire environment. One high-temperature protective coating is CP4010 provided by Aremco Products, Inc. of Valley Cottage, N.Y. under the trademark Corr-Paint. This protective coating is a silicone-based, heat resistant coating that is VOC-compliant, water dispersible silicone resin. This coating provides adherence to metals and provides thermal resistance to temperatures to 1100° F. when applied at a wet film thickness of five mils or a corresponding dry film thickness of 1.5 mils. Other thermal coatings may also be appropriate.

In applying the thermal coating to a fitting such as a nipple 164, the nipple outside surfaces should be free of oil, grease, dirt, corrosives, oxides, pains or other foreign matter. The front end (conical sealing surface) of the nipple 164 is masked. The thermal coating 170 is applied using a spray paint gun. The coating 170 is typically applied at a wet film thickness of five mils. The coating 170 is then allowed to dry and then is cured at an elevated temperature for a set time. It is further noted that in addition to providing a thermal resistant benefit, testing using thermal coated nipples 164 with hose 100 in qualification testing of hose assemblies has shown that the thermal coatings do not adversely affect the fitting or hose assembly in stress degradation testing, proof testing, or electrical conductivity testing.

A hose in accordance with the present invention may be fire resistant and/or fireproof as defined by SAE AS1055 for the particular hose material. AS1055 classifies fire protection as fire resistant (Class A) where the hose withstands the designated fire test for 5 minutes without evidence of leakage, and as fireproof (Class B) where the hose withstands the designated fire test for 15 minutes without evidence of leakage. The flow conditions under which a hose may be considered fire resistant or fireproof may be selected as desired for a particular purpose or intended use. For example, the amount of flow within the hose may affect the ability of a hose to withstand the flame in a fire test for a given period. Engines and other environments in which the hose may be used are being designed so that the fluid flow through the hose may be stopped during a fire. Thus, in one embodiment it may be desirable for the hose to be fire resistant or fireproof under zero flow conditions.

The invention may be further understood with reference to the following example. The example is for the purpose of illustrating an embodiment of a hose in accordance with the present invention and is not intended to be limiting in any manner. For example, a hose was constructed with the Stratoflex 171-4 Hose (PTFE core tube with a high density braid of small diameter corrosion resistant wire as a reinforcement layer) as the underlying hose structure, a silica fiber layer surrounding the high density braid for fire protection, a polyimide film (Kapton® HN available from DuPont) surrounding the fiber layer for abrasion resistance and oil wetting resistance layer, and a CRES Braid (MC3800-08) as a vented jacket/protective cover with a 13522-12CR modified socket (available from Parker Hannifin) crimped on the ends. The silica fiber layer had a thickness of about 0.188 inches, and the polyimide film had a thickness of about 0.010 inches. The hose assembly was successfully tested for both low flow and zero flow fire protection using the fire test as specified as AS1055 with zero flow for a period of 15 minutes without evidence of leakage and without ablation of the silica fiber layer.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A hose assembly comprising:
   a core tube;
   an insulating layer surrounding the core tube;
   a vented anti-chafing jacket surrounding the insulating layer; and
   a chemical resistant polyimide layer interposed between the insulating layer and the vented anti-chafing jacket;
   wherein the vented anti-chafing jacket is the outermost layer of the hose; and
   wherein the insulating layer is non-ablative at least when the hose is subjected to a fire at 2000° F. for a period of 15 minutes.

2. A hose assembly comprising:
   a core tube;
   an insulating layer surrounding the core tube; and
   a vented anti-chafing jacket surrounding the insulating layer, the vented anti-chafing jacket comprises a corrosion resistant material chosen from a stainless steel, a nickel alloy, or combinations thereof;
   anti-chafing jacket is the outermost layer of the hose; and
   wherein the insulating layer is non-ablative at least when the hose is subjected to a fire at 2000° F. for a period of 15 minutes.

3. The hose assembly of claim 2, wherein the insulating layer comprises a material chosen from a silica fiber, a fiberglass, a ceramic fiber, or combinations thereof.

4. The hose assembly of claim 2, wherein the vented jacket comprises a CRES or nickel alloy wire braid having interstices therein.

5. The hose assembly of claim 4, wherein the wire braid is formed from a type 321 stainless steel, a type 347 stainless steel, or combinations thereof.

6. The hose assembly of claim 2, wherein the vented jacket comprises a corrugated tube comprising at least one vent hole disposed through a wall thereof.

7. The hose assembly of claim 2 further comprising a fitting and a sleeve attached to each end of the hose.

8. The hose assembly of claim 7, wherein an exterior surface of a nipple portion of the fitting is coated with a thermal paint.

9. A hose assembly comprising:
   a PTFE tube;
   a reinforcing layer surrounding the PTFE tube;
   an insulation layer comprising silica fiber, the insulation layer surrounding the reinforcing layer;
   a cover layer comprising a polyimide film, the cover layer surrounding the insulation layer; and
   a corrosion resistant braid positioned about the polyimide layer and forming an outer layer of the hose.

10. The hose assembly of claim 9 further comprising a steel sleeve on each end of the hose, the steel sleeve positioned about the outer layer of the hose.

11. The hose assembly of claim 9 further comprising a fitting attached to each end of the hose, wherein an exterior surface of a nipple portion of each fitting is coated with a thermal paint.

12. A hose assembly comprising:
    a core tube;
    a fitting attached to each end of the core tube, wherein an exterior surface of a nipple portion of each fitting is coated with a thermal paint and inserted into the core tube.

13. The hose assembly of claim 12 further comprising:
    an insulating layer surrounding the core tube;
    a chemical resistant layer surrounding the insulating layer; and
    a vented anti-chafing jacket surrounding the chemical resistant layer.

14. The hose assembly of claim 13, wherein the insulating layer comprises a material chosen from a silica fiber, a fiberglass, a ceramic fiber, or combinations thereof.

15. The hose assembly of claim 13, wherein the chemical resistant layer comprises a polyimide film.

16. The hose assembly of claim 13, wherein the vented anti-chafing jacket comprises a CRES or nickel alloy wire braid having interstices therein.

17. The hose assembly of claim 9, wherein the insulating layer is non-ablative at least when the hose is subjected to a fire at 2000° F. for a period of 15 minutes.

18. The hose assembly of claim 13, wherein the insulating layer is non-ablative at least when the hose is subjected to a fire at 2000° F. for a period of 15 minutes.

* * * * *